(12) United States Patent
Nishihara

(10) Patent No.: US 10,003,107 B2
(45) Date of Patent: Jun. 19, 2018

(54) POWER SOURCE DEVICE

(71) Applicant: SANYO Electric Co., Ltd., Osaka (JP)

(72) Inventor: Yoshitomo Nishihara, Hyogo (JP)

(73) Assignee: SANYO ELECTRIC CO., LTD., Osaka (JP)

( * ) Notice: Subject to any disclaimer, the term of this patent is extended or adjusted under 35 U.S.C. 154(b) by 266 days.

(21) Appl. No.: 15/102,521

(22) PCT Filed: Nov. 18, 2014

(86) PCT No.: PCT/JP2014/005769
§ 371 (c)(1),
(2) Date: Jun. 7, 2016

(87) PCT Pub. No.: WO2015/107583
PCT Pub. Date: Jul. 23, 2015

(65) Prior Publication Data
US 2016/0372796 A1    Dec. 22, 2016

(30) Foreign Application Priority Data

Jan. 17, 2014   (JP) ................................. 2014-006556

(51) Int. Cl.
*H01M 10/42*     (2006.01)
*H01M 10/48*     (2006.01)
(Continued)

(52) U.S. Cl.
CPC ....... *H01M 10/425* (2013.01); *H01M 2/1061* (2013.01); *H01M 2/1077* (2013.01);
(Continued)

(58) Field of Classification Search
CPC .. H01M 2/1061; H01M 2/1077; H01M 2/202; H01M 10/425; H01M 10/482; H01M 2010/4271
See application file for complete search history.

(56) References Cited

U.S. PATENT DOCUMENTS

2008/0233475 A1   9/2008  Kozu et al.
2011/0101920 A1   5/2011  Seo et al.
(Continued)

FOREIGN PATENT DOCUMENTS

JP    2011-228217    11/2011
JP    2012-028186    2/2012
(Continued)

OTHER PUBLICATIONS

International Search Report of PCT application No. PCT/JP2014/005769 dated Feb. 10, 2015.

*Primary Examiner* — Brittany Raymond
(74) *Attorney, Agent, or Firm* — Wenderoth, Lind & Ponack, L.L.P.

(57) ABSTRACT

A power source device has: battery cells respectively having electrode terminals; a rigid circuit board including a detection circuit for detecting states in the battery cells; a FPC electrically connecting the electrode terminals and the detection circuit; and, connecting members provided at a tip of the PFC, electrically connecting the battery cells and the FPC. The FPC has fixing portions fixed to the rigid circuit board. The fixing portions include: a signal line connecting portion having conductive foils of which one side ends are fixed to the rigid circuit board, which electrically connect the electrode terminals and the detection circuit; and a reinforcing portion having a fixing metal foil of which one side end is fixed to the rigid circuit board, which is insulated from the electrode terminals. The signal line connecting portion has a connecting area overlapping the rigid circuit board.

9 Claims, 11 Drawing Sheets

(51) Int. Cl.
*H01M 2/10* (2006.01)
*H01M 2/20* (2006.01)

(52) U.S. Cl.
CPC ......... *H01M 2/202* (2013.01); *H01M 10/482* (2013.01); *H01M 2010/4271* (2013.01)

(56) References Cited

U.S. PATENT DOCUMENTS

| | | |
|---|---|---|
| 2011/0156618 A1 | 6/2011 | Seo et al. |
| 2012/0019061 A1 | 1/2012 | Nishihara et al. |
| 2013/0000957 A1 | 1/2013 | Ikeda et al. |
| 2015/0137824 A1 | 5/2015 | Nishihara |

FOREIGN PATENT DOCUMENTS

| | | |
|---|---|---|
| WO | 2005/069408 | 7/2005 |
| WO | 2010/113455 | 10/2010 |
| WO | 2014/024435 | 2/2014 |
| WO | 2014/024452 | 2/2014 |

POWER SOURCE DEVICE

CROSS-REFERENCE TO RELATED APPLICATIONS

This application is a U.S. national stage application of the PCT International Application No. PCT/JP2014/005769 filed on Nov. 18, 2014, which claims the benefit of foreign priority of Japanese patent application 2014-006556 filed on Jan.17, 2014, the contents all of which are incorporated herein by reference.

TECHNICAL FIELD

The present invention relates to a power source device including a plurality of battery cells respectively having electrode terminals, and a flexible printed circuit board electrically connected to the electrode terminals.

BACKGROUND ART

A power source device having a plurality of battery cells, includes a detection circuit for always monitoring a voltage in each of the secondary battery cells, a temperature, or the like in order to prevent abnormal states in the battery cells of over-charge, over-discharge, or the like. The detected voltages are also used for correctly estimating the remaining capacity (=State Of Charge: SOC) of an assembled battery. Especially, as a lithium ion battery can be used in the wide range of SOC, the over-charge range or the over-discharge range is close to the normal using range, and then it is necessary to more strictly manage the voltages in lithium ion batteries than other type of batteries.

The following is known. The plurality of the battery cells are assembled into the battery block, and this can downsize the power source device. This type of the power source device can also include a rigid circuit board including a detection circuit, and a wiring module which modularizes wirings connecting the detection circuit and the battery cells. A flexible printed circuit board suitable for modularizing may be used as the wirings (Patent Literature 1). The flexible printed circuit board can easily deform the wirings while binding the wirings, and can provide the wiring module of good assemblability.

The flexible printed circuit board is configured of conductive foils as conductive part, and a flexible insulating film. It is known that a cupper foil is used as the conductive foil, and the insulating film is made of polyimide or the like.

A power source device of Patent Literature 1 has a plurality of battery cells, a rigid circuit board including a detection circuit, and a flexible printed circuit board including wirings connecting the detection circuit and the battery cells. The flexible printed circuit board has connecting members at one end thereof, and is connected to electrode terminals of battery cells or bus-bars which connect the electrode terminals each other, through connecting members. The flexible printed circuit board is directly soldered to the rigid circuit board.

CITATION LIST

Patent Literature

Patent Literature 1: Japanese Laid-Open Patent Publication No. 2012-28186

SUMMARY OF THE INVENTION

As disclosed in Patent Literature 1, connecting members are needed in order to electrically connect the electrode terminals of the battery cells and the flexible printed circuit board. In the assembling process, the rigid circuit board is fixed to a battery block, in a state where the flexible printed circuit board is soldered to the rigid circuit board. As the connecting members are connected to a tip of the flexible printed circuit board, in a step of connecting the rigid circuit board to the battery block, the rigid circuit board is handled in a state where a load is applied to solder portion connecting the flexible printed circuit board and the rigid circuit board. Thus, the power source device of Patent Literature 1 has a trouble that the load is concentrated at connecting portion of the flexible printed circuit board and the rigid circuit board, and then the conductive foil of the flexible printed circuit board is removed, or disconnected.

The present invention is developed for the purpose of solving such requirements. The present invention provides a technology that reduces a load on a conductive foil of a flexible printed circuit board and prevents removal or disconnection of the conductive foil.

To solve the above-mentioned requirement, a power source device of one embodiment of the present invention, has: a plurality of battery cells respectively having electrode terminals; a rigid circuit board including a detection circuit for detecting states in the plurality of the battery cells; a flexible printed circuit board electrically connecting the electrode terminals and the detection circuit; and, connecting members provided at a tip of the flexible printed circuit board, electrically connecting the plurality of the battery cells and the flexible printed circuit board. The flexible printed circuit board has a plurality of fixing portions fixed to the rigid circuit board. The plurality of the fixing portions include: a signal line connecting portion having a plurality of conductive foils of which one side ends are fixed to the rigid circuit board, which electrically connect the electrode terminals and the detection circuit; and a reinforcing portion having a fixing metal foil of which one side end is fixed to the rigid circuit board, which is insulated from the electrode terminals. The signal line connecting portion have a connecting area overlapping the rigid circuit board. The power source device of the one embodiment of the present invention, is a reinforcing pad extending in a direction perpendicular to an extending direction of the plurality of the conductive foils within the connecting area.

According to the present invention, as not only the signal line connecting portion electrically connecting the rigid circuit board and the flexible printed circuit board, but also the reinforcing portion holding the flexible printed circuit board is provided, the load of the flexible printed circuit board is prevented from concentrating at the conductive foil as the wiring.

DESCRIPTION OF EMBODIMENTS

Figure 1:
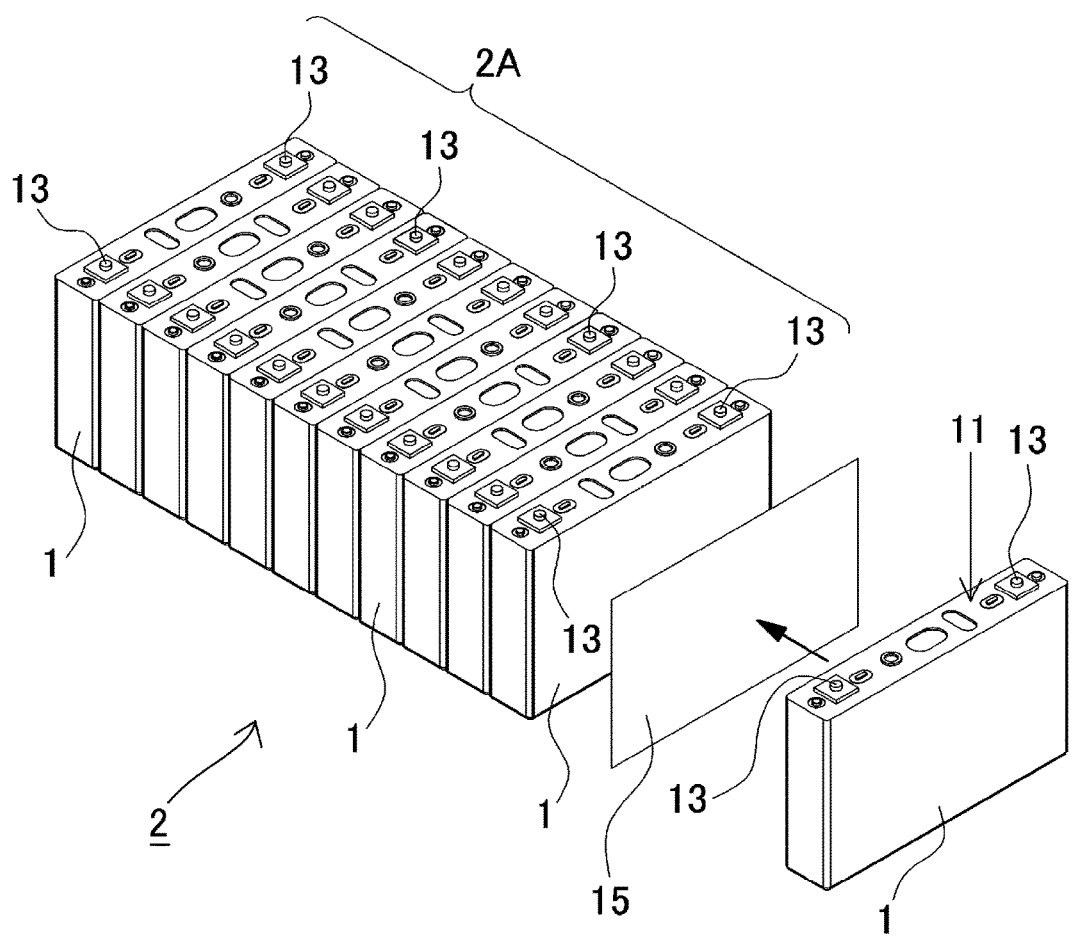
FIG. 1 is a perspective view of a battery block according to one embodiment of the present invention.
Figure 2:
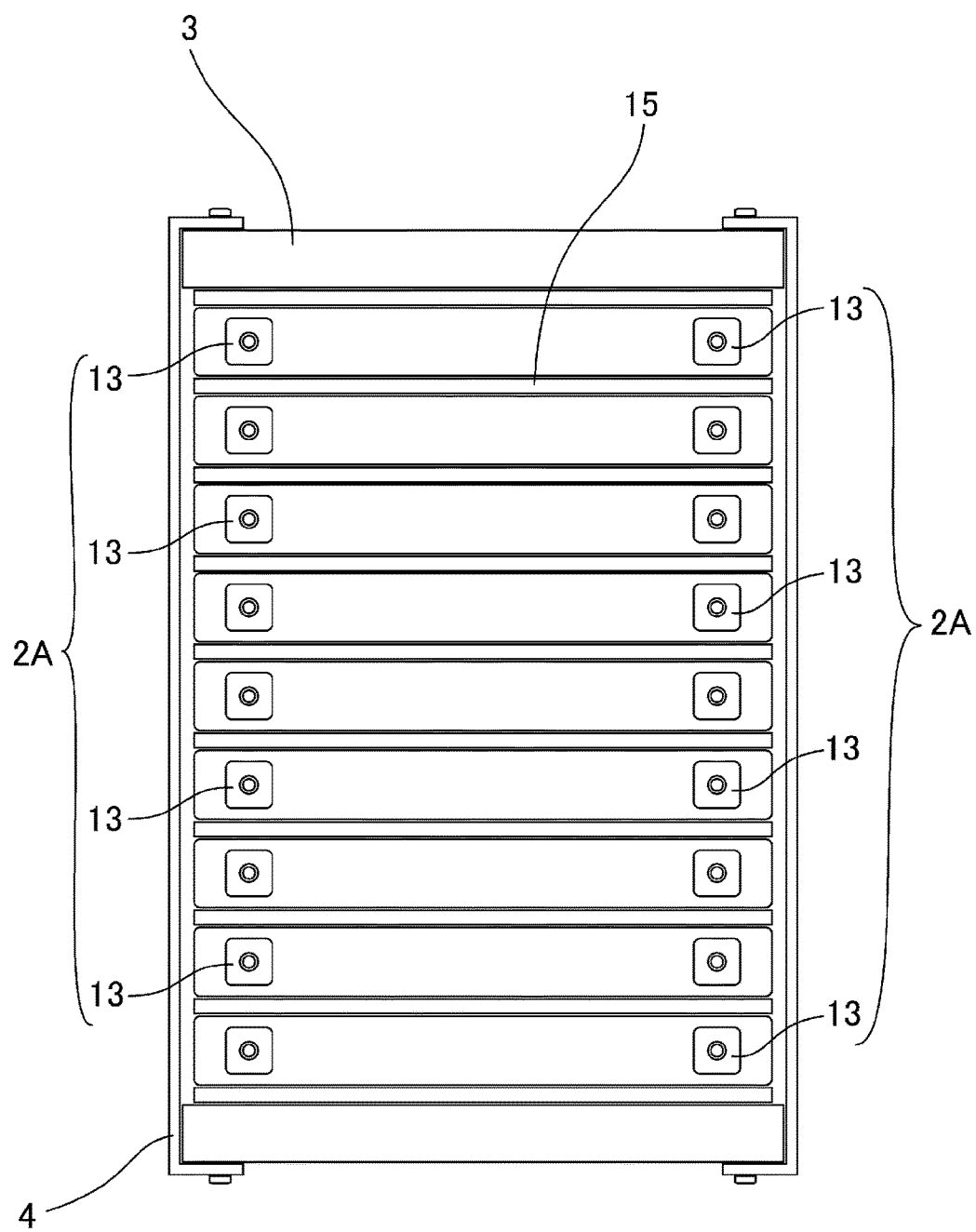
FIG. 2 is a plan view of the battery block according to the one embodiment of the present invention.
Figure 4:
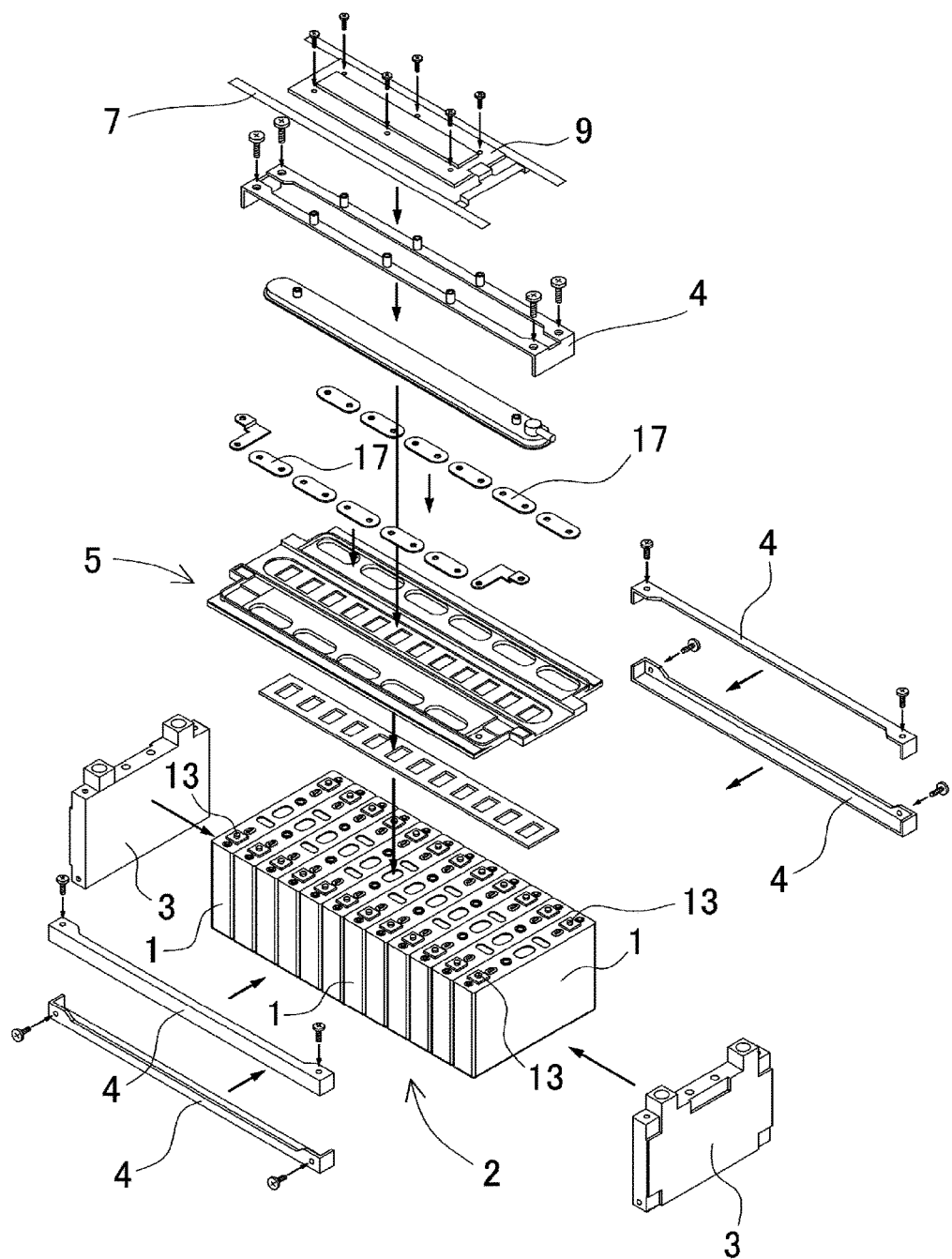
FIG. 4 is a exploded perspective view of a power source device according to the one embodiment of the present invention.

As shown in FIG. 1, FIG. 2, a power source device according to one embodiment of the present invention, has battery block 2 in which a plurality of battery cells 1 are stacked. The plurality of battery cells 1 is a prismatic battery having outer can 11 of a flat rectangular parallelepiped shape. The plurality of battery cells 11 have positive and negative electrode terminals 13 at the upper surface thereof, and are disposed such that electrode terminals 13 are arranged at the one surface of battery block 2. The plurality of battery cells 2 constituting battery block 2 are disposed to be stacked such that electrode terminals 13 of adjacent battery cells 1 are close to each other, making a pair of terminal lines 2A. As shown in FIG. 4, electrode terminals 13 of adjacent battery cells 1 are connected each other by bus-bars 17, and then battery cells 11 are connected in series or in parallel.

In battery block 2, the output voltage is determined corresponding to the number of series-connected battery cells 1, and the capacity is determined corresponding to the number of parallel-connected battery cells 1. For example, when battery cell 1 is a lithium ion battery having the voltage of 4 V and the capacity of 5 Ah, the battery block has the output voltage of 40 V in a case of series-connected battery cells of 10 pieces, and the batter block has the capacity of 50 Ah in a case of parallel-connected battery cells of 10 pieces. In battery block 2, battery cells 1 are suitably series-connected or parallel-connected corresponding to required performance of the power source device. Further, battery blocks 2 can be series-connected each other, or parallel-connected.

Here, battery cell 1 may be a cylindrical battery having a cylindrical outer can, or a pouch battery having a outer case made of insulating film. As kinds of batteries, many kinds of batteries such as lithium ion batteries, nickel hydride batteries, or the like can be used. Even in a case of adopting any one of the batteries, the one embodiment of the present invention is configured of battery block 2 into which the plurality of the battery cells are assembled so as to make the plurality of terminal lines 2A. The one embodiment of a case of adopting lithium ion batteries having the outer can of the flat rectangular parallelepiped shape, is explained in detail in the following.

Figure 3:
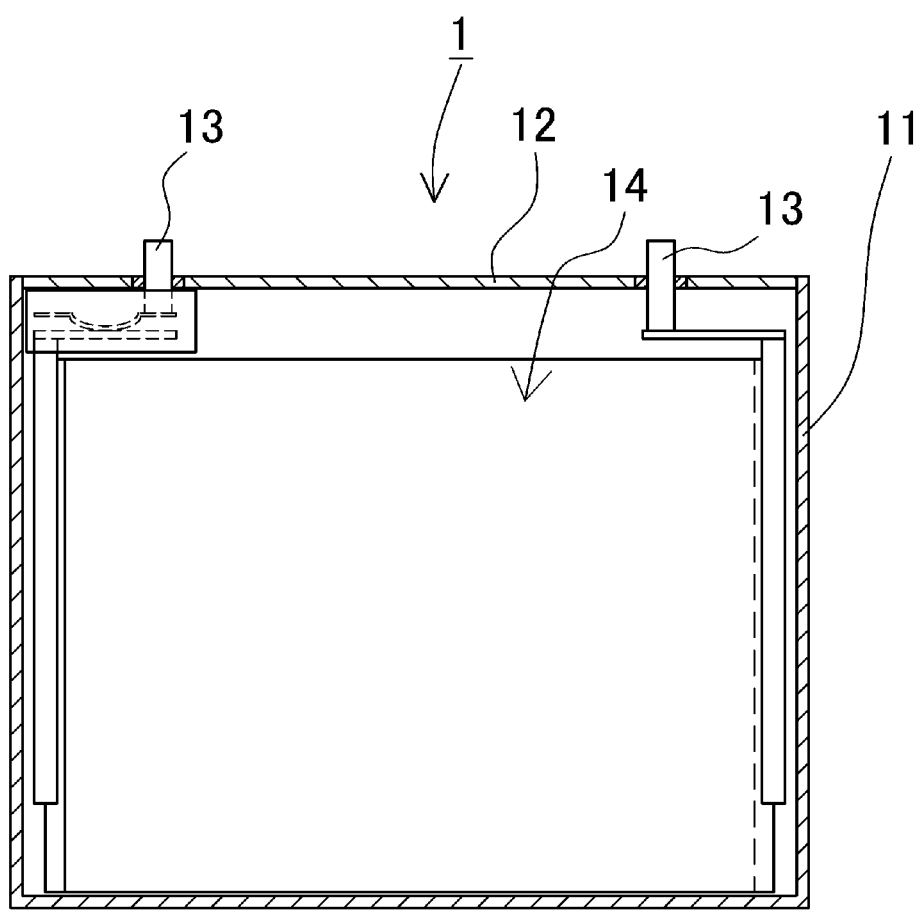
FIG. 3 is a sectional view of a prismatic battery according to the one embodiment of the present invention.

As shown in FIG. 3, battery cell 1 is configured of outer can 11 having the rectangular parallelepiped shape with the one surface opened, sealing plate 12 closing the opening of outer can 11, electrode assembly 14 fixed to sealing plate 12, and electrolyte injected in outer can 11. Outer can 11 is made of metal such as aluminum, or aluminum alloy. The battery cell 1 having the metal outer can 11, can increase the strength of the outer can 11, or can prevent battery temperature from increasing by cooling the outer can. As the battery cell 1 having the metal outer can 11 has an electric potential of outer can 11, it is necessary to insulate adjacent battery cells 1 from each other.

As shown in FIG. 1, battery block 2 includes spacers 15 having insulation property, and spacers 15 are respectively interposed between adjacent battery cells 1. Concretely, battery cells 1 and spacers 15 are alternatively stacked, forming battery block 2. As not shown in the figures, cooling air channel for cooling battery cells 1 may be provided at spacers 15.

As shown in FIG. 4, battery block 2 includes a pair of end plates 3 at both ends thereof in the stacked direction of battery cells 2. The pair of end plates 3 are fixed each other by binding bars 4, connecting batter cells 1 into the assembled battery. When the prismatic battery is used as battery cell 1, stacked battery cells 1 become apt to swell in the stacked direction, because of the outer shape of the flat rectangular parallelepiped shape. Thus, in the power source device adopting battery cell 1 of the prismatic battery, end plates 5 and binding bar 4 not only connect battery cells, but also prevent battery cells 1 from swell.

Rigid circuit board 9 are disposed at the upper surface of battery block 3 where electrode terminals 13 of battery cells 1 are arranged. Rigid circuit board 9 can be directly disposed on battery block 2, and can be also disposed so as to interpose resin plate 5 between rigid circuit board 9 and battery cells 1. In the power source device shown in FIG. 4, the wiring module assembly is disposed on the upper surface of battery block 2. The wiring module assembly is configured of bus-bars 17 connecting the electrode terminals of battery cells 1, insulating resin plate 5 holding bus-bars 17, and rigid circuit board 9 fixed to resin plate 5. Flexible printed circuit board 7 as wiring member is connected to rigid circuit board 9.

Figure 5:
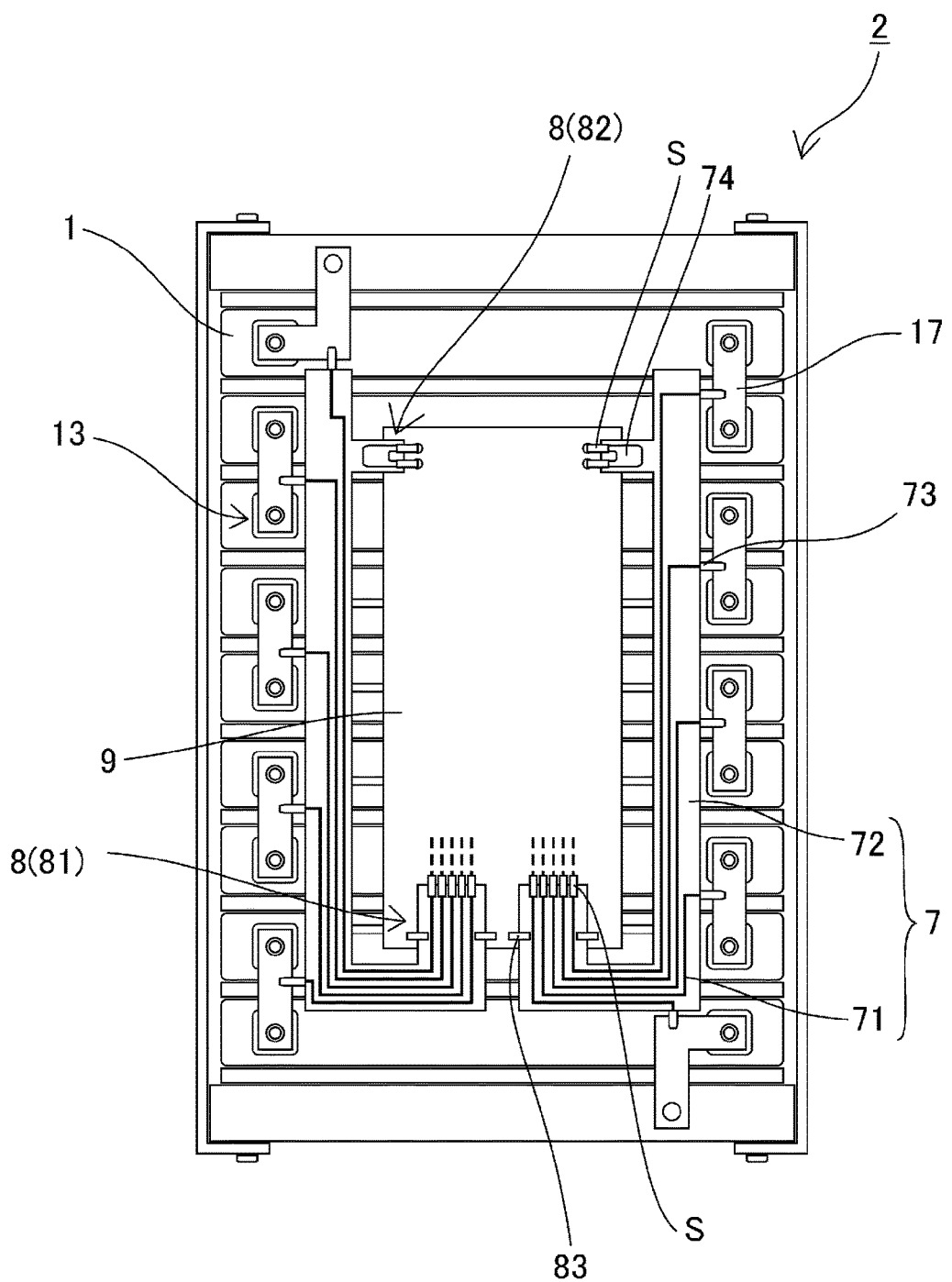
FIG. 5 is a plan view of a flexible printed circuit board according to the one embodiment of the present invention.

As shown in FIG. 5, rigid circuit board 9 is a rigid circuit board having the rectangular shape in a plan view. Rigid circuit board 9 includes the printed conductive layer having a designed pattern formed at the insulating resin layer as a substrate. For, example, as the insulating resin layer used is melamine derivatives such as BT resin etc., liquid crystal polymer, epoxy resin, PPE resin, polyimide resin, fluorine resin, phenol resin, thermo-setting resin such as polyamide bismaleimide, etc. The conductive layer is made of metal material such as cupper or the like. Here, the conductive layer can be provided not only on the surface of the insulating resin layer, but also inside the insulating resin layer. For example, a multilayered substrate having a plurality of layers including the insulating resin layer and the conductive layer is exemplified as this type of the rigid circuit board. When it has the circuit including the complicated pattern, the multilayered substrate can prevents size increase of the rigid circuit board.

Figure 11:
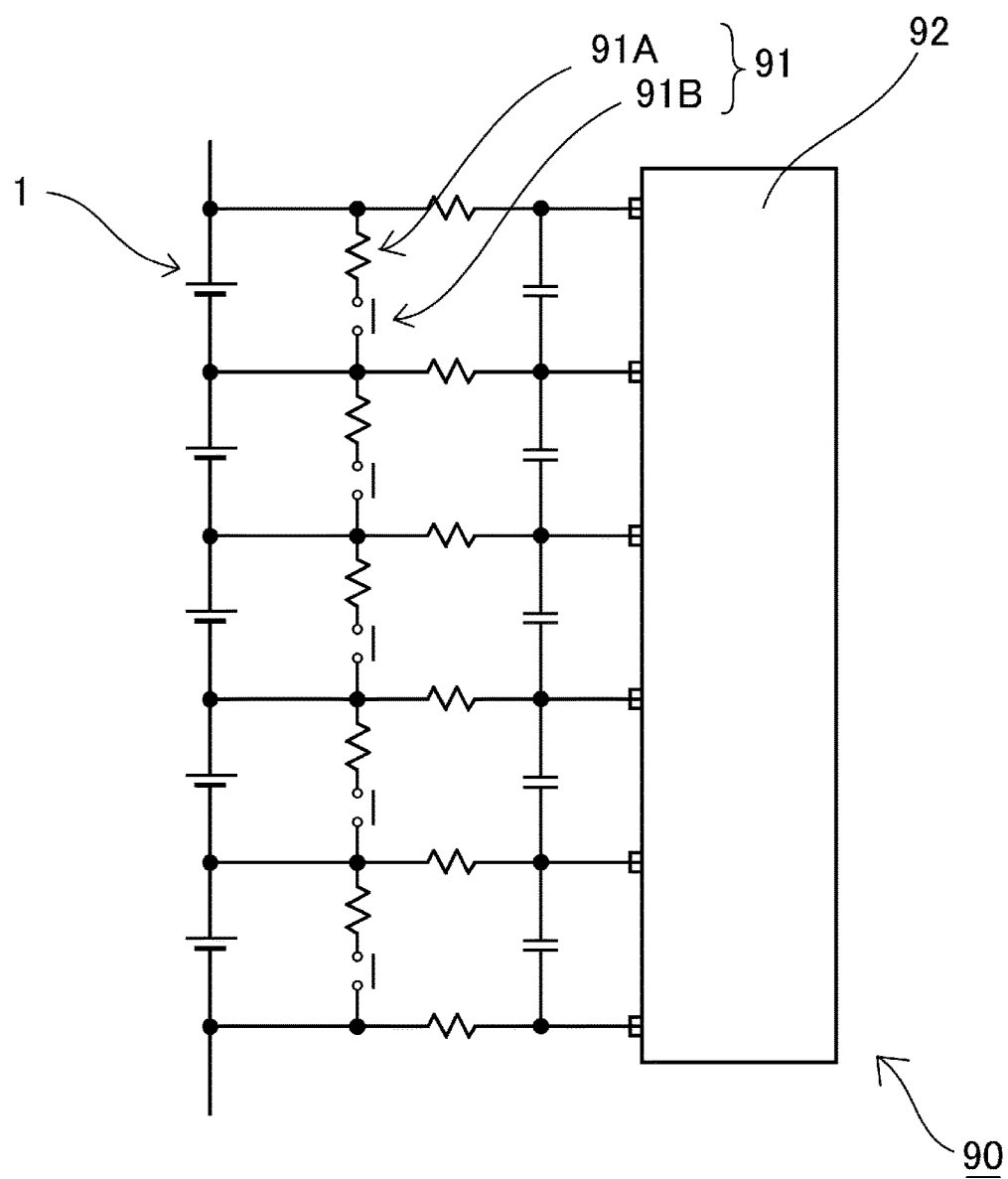
FIG. 11 is a circuit diagram of a detection circuit according to the one embodiment of the present invention.

Rigid circuit board 9 includes detection circuit 90 for detecting states of battery cells 1. Concretely, electric components, which include semiconductor elements such as ICs and passive elements such as resistors or capacitors, are mounted on rigid circuit board 9. Then, detection circuit 90 is configured of the electric components and the conductive layers of rigid circuit board 9. FIG. 11 exemplifies a circuit diagram of detection circuit 90. Detection circuit 90 includes voltage detecting circuit 92 which detects the voltages between the terminals through the voltage detection lines connected to the nodes between the battery cells, and discharge circuit 5 which equalizes the remaining capacities of battery cells 1 and the voltages of battery cells 1. Discharge circuit 91 is provided so as to bypass the voltage detection lines, and configured of discharge resistor 91A and switch 91B. When switch 91B is turned on, a current flows to discharge resistor 91A from the corresponding battery cell 1, and then the corresponding battery cell 1 is discharged. When unbalance of the remaining capacities in battery cells 1 occur, discharge circuit 3 forcibly discharges the battery cells 1 having high remaining capacities so as to equalize the remaining capacities.

Especially in a case of lithium ion batteries, as they are remarkably degraded in the over-charge state or the over-discharge state, it is necessary that detection circuit 90 detects states of battery cells 1 with high accuracy. Therefore, it is required that the wiring resistances between detection circuit 90 and electrode terminals 13 of battery cells 1 are minimized. In the one embodiment of the present invention, rigid circuit board 9 is closely disposed to battery block 2, and then wirings can be shortened. Thus, loss by wiring resistance can be decreased. Especially, as exemplified in FIG. 5, rigid circuit board 9 is preferably disposed between the pair of the terminal lines 2A formed at battery block 2.

Here, above-mentioned "between the pair of the terminal lines 2A" is irrespective of the vertical direction. When rigid circuit board 9 and battery block 1 are closely disposed, there is a trouble that short-circuit occurs by contacting of rigid circuit board 9 and battery block 2. Therefore, insulating distance between rigid circuit board 9 and battery block 2 is secured, or resin plate 5 is interposed between rigid circuit board 9 and battery block 2. In those configurations, it happens that rigid circuit board 9 is disposed at higher position than that of electrode terminals 13 of battery cells 1. Even in such a configuration, in a plan view where battery block 2 is seen from above, rigid circuit board 9 is disposed between terminal lines 2A, and then the wirings can be shortened.

Further, rigid circuit board 9 is not necessarily disposed on the upper surface of battery block 2. It happens that electrode terminals 13 are not disposed at the upper surface in battery block 2, depending on structure of battery cells 1 constituting battery block 2. For example, adopted is the battery cell where the electrode terminals are formed at both ends of the cylindrical battery cell, and then the electrode terminals are disposed at two surfaces of the battery block facing each other. In this configuration, the rigid circuit board is disposed at one surface adjacent to the two surfaces where the electrode terminals are located. According to this configuration, the wiring connecting the rigid circuit board and the battery block can be shortened, and then wiring loss can be decreased.

As shown in FIGS. 5 to 9, flexible printed circuit board 7 is configured of conductive foil 71 made of metal foil, and insulation film 72 covering conductive foil 71. As flexible printed circuit board 7 has a foil shape, flexible printed circuit board, 7 has flexibility. As insulation film 72, insulation resin material such as polyimide or the like is used. When requirement of heat resistance is low in such a case as flexible printed circuit board 7 is not soldered, polyester, polyethylenenaphthalate, or the like can be used as insulation film 72. Further, plural kinds of insulation resin materials are used as insulation film 72. For example, epoxy layer can be provided between polyimide layer and cupper layer. In this configuration, the epoxy layer adheres the polyimide layer and the cupper layer. In order to improve the flexibility of flexible printed circuit board 7, copper clad laminates can be used as conductive foil 71. The copper clad laminates have excellent elasticity and excellent heat resistance, and also have low thermal expansion.

Conductive foil 71 of flexible printed circuit board 7 electrically connects detection circuit 90 installed in rigid circuit board 9 and battery cells 1. In the one embodiment of the present invention, electrode terminals 13 of adjacent battery cells 1 are connected through bus-bars 17, and conductive foils 71 of flexible printed circuit board 7 are connected to bus-bars 17. A plurality of tabs 73 are provided at the tips of conductive foils 71 for connecting bus-bars 17. Tab 73 is welded in a state where it is disposed on the upper surface of corresponding bus-bar 17. Also, conductive foils 71 are soldered to the conductive layers of rigid circuit board 9. By this configuration, the electric potential of electrode terminal 13 in each of battery cells 1, is input into detection circuit 90 installed in rigid circuit board 9.

As mentioned above, flexible printed circuit board 7 is fixed to rigid circuit board 9 by soldering. Considering working efficiency, rigid circuit board 9 is disposed on resin plate 5 or battery block 2 in a state where flexible printed circuit board 7 is fixed to rigid circuit board 9. Therefore, when rigid circuit board 9 is disposed, the free end side of flexible printed circuit board 7 hangs down, and then it decreases handleability. Here, as tabs 73 are provided at the tips of flexible printed circuit board 7, considerably large load is applied to fixing portion of flexible printed circuit board 7 and rigid circuit board 9. Accordingly, in the power source device having the flexible printed circuit board, fixing structure of the flexible printed circuit board and the rigid circuit board is important.

Here, in the above-mentioned embodiment, tabs 73 provided at the tips of flexible printed circuit board 7, are welded to bus-bars 17. Instead, the tips of flexible printed circuit board 7 can be directly welded to bus-bars 17. In order that bus-bar 17 is connected to electrode terminal 13, bus-bar 17 is larger and heavier than tab 73. In the configuration that the tips of flexible printed circuit board 7 are directly provided and fixed to bus-bars 17, fixing structure of the flexible printed circuit board and the rigid circuit board becomes more important.

Figure 9:
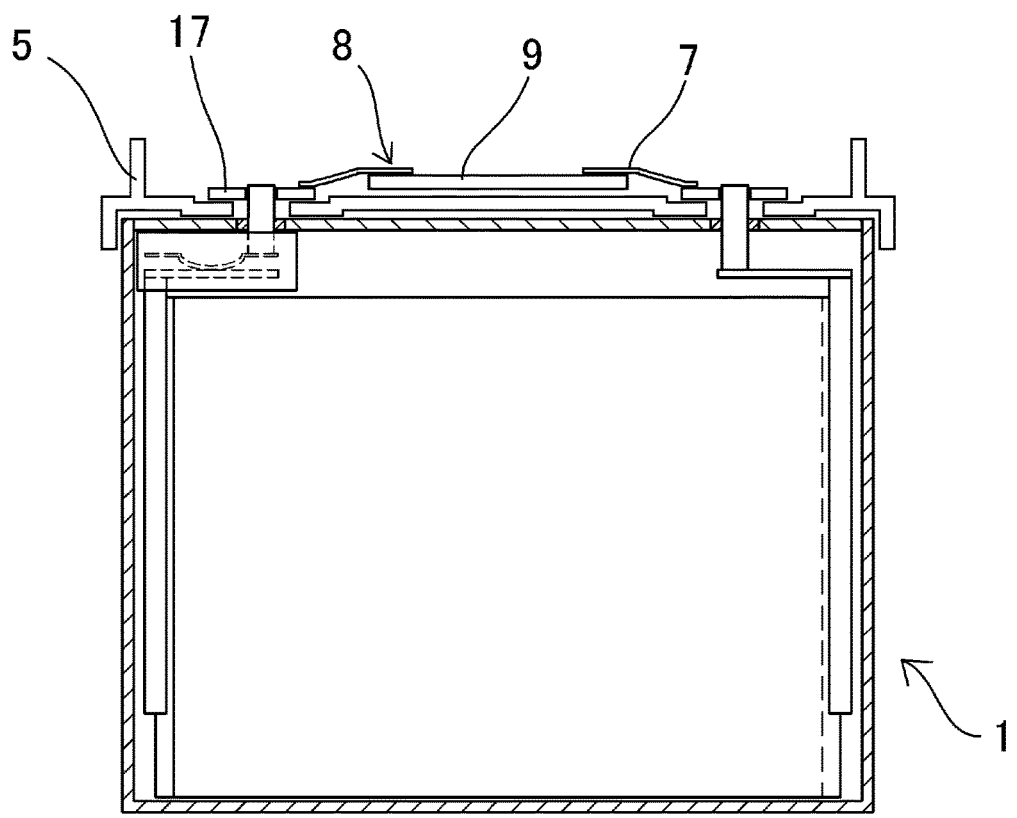
FIG. 9 is a figure showing a positional relation of the flexible printed circuit board and the rigid circuit board according to the one embodiment of the present invention.
Figure 10:
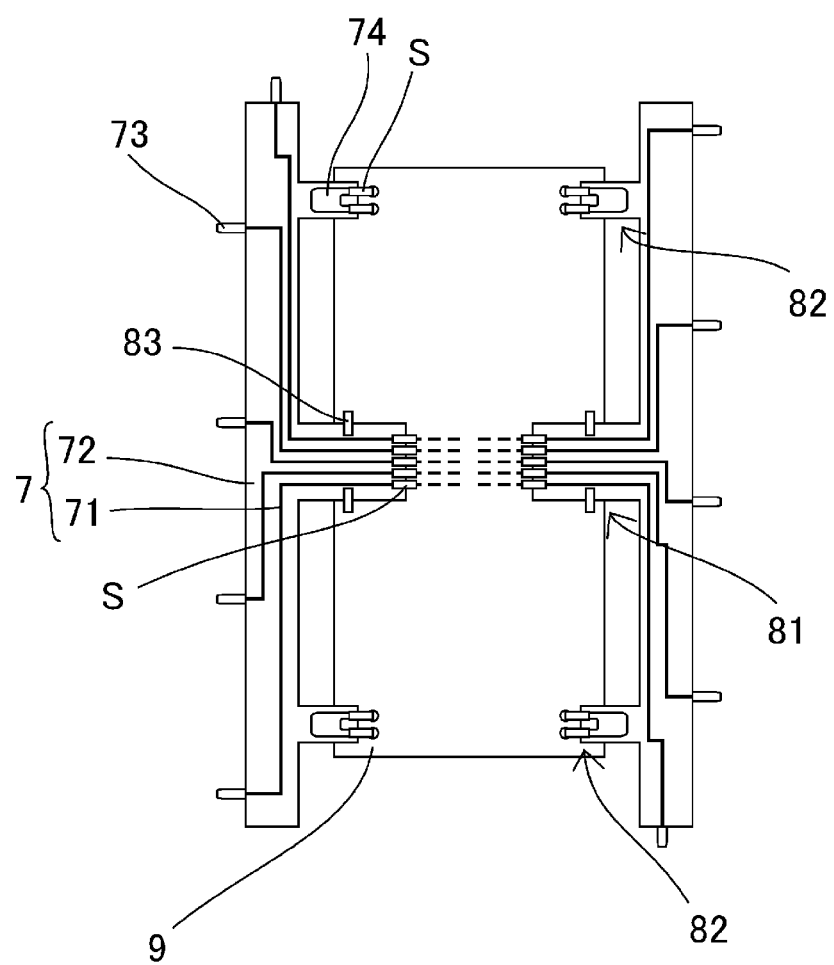
FIG. 10 is a plan view showing a reinforcing pad according to the another embodiment of the present invention.

Next, the fixing structure of the flexible printed circuit board and the rigid circuit board according to the one embodiment of the present invention, is explained in detail. As shown in FIG. 5 and FIG. 9, flexible printed circuit board 7 is disposed so as to overlap rigid circuit board 9, and has a plurality of fixing portions 8 fixed to rigid circuit board 9. Fixing portions 8 are configured of signal line connecting portions 81 where conductive foils 71 of flexible printed circuit board, 7 are connected to the conductive layers of rigid circuit board 9, and reinforcing portions 82 where flexible printed circuit board, 7 is fixed and held to rigid circuit board 9. In the embodiment of the present invention, each of fixing portions 8 is fixed to rigid circuit board 9 through solder S. In soldering, metals are connected each other.

As mentioned above, flexible printed circuit board 7 has conductive foils 71 as the wiring. Conductive foils 71 as the wirings are concentrated at one portion by using the wiring patterns of rigid circuit board 9, to make a size of rigid circuit board 9 decreased. In the embodiment of the present invention, conductive foils 71 are located at signal line connecting portions 81, and conductive foils 71 are soldered to rigid circuit board 9, and then signal line connecting portions 81 are fixed. By this configuration, conductive foils 71 electrically connect detection circuit 90 and battery cells 1, and also mechanically connect flexible printed circuit board 7 and rigid circuit board 9. While, fixing portions 8 other than signal line connecting portions 81, namely, reinforcing portions 82 are not located at conductive foils 71, and then conductive foils 71 cannot be used to fix reinforcing portions 82.

Figure 6:
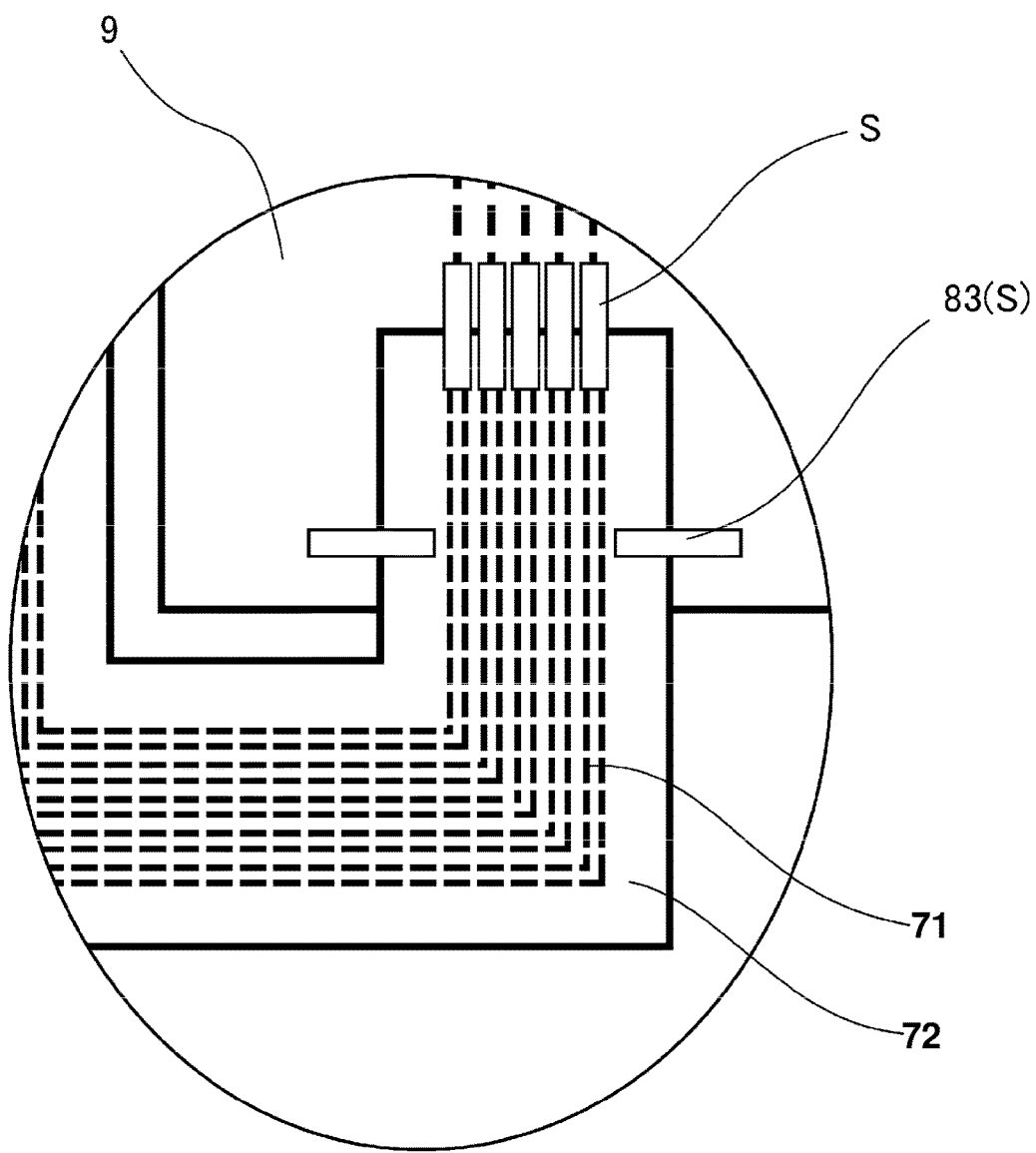
FIG. 6 is an enlarged figure of the flexible printed circuit board of FIG. 5.
Figure 7:
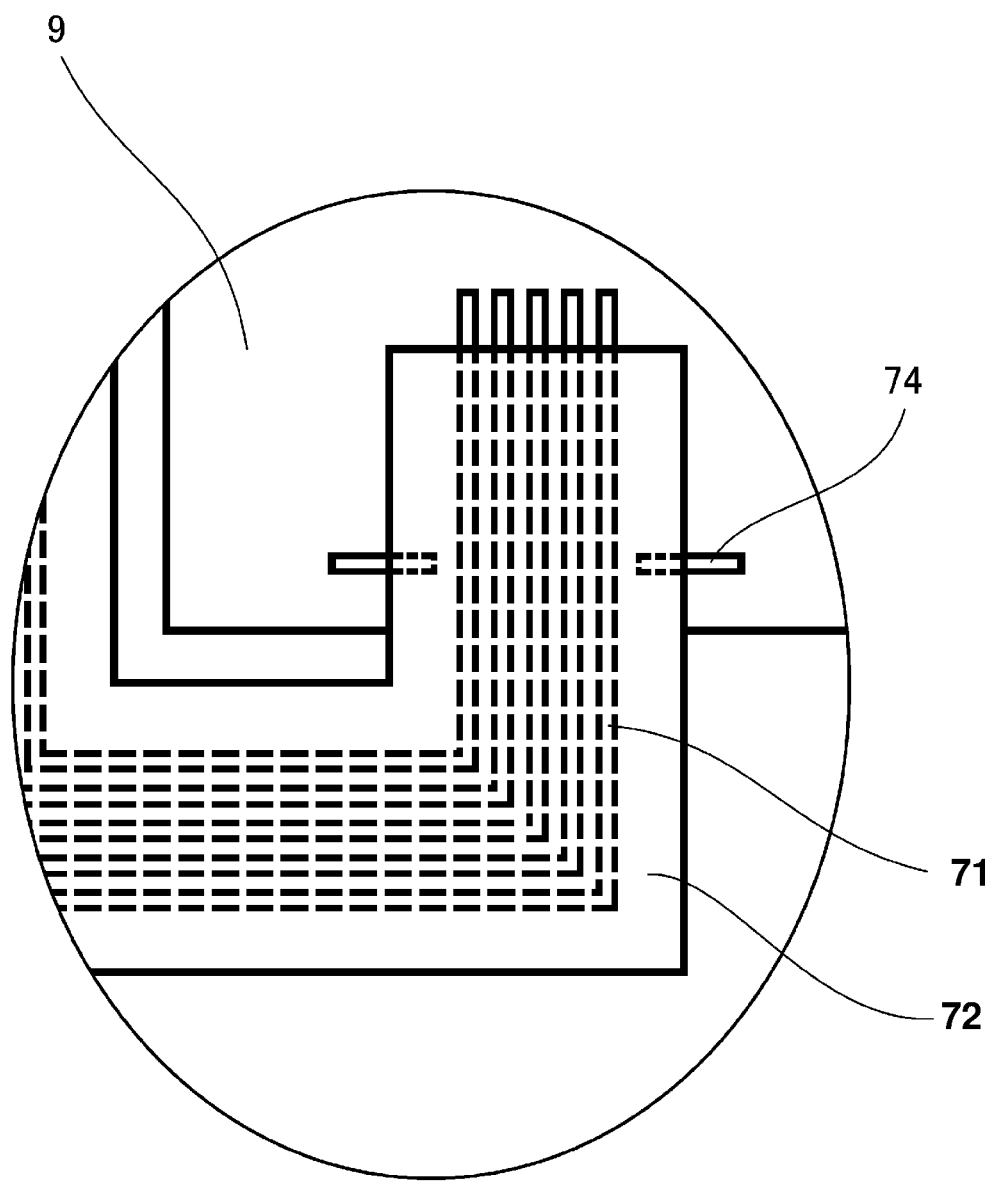
FIG. 7 is a figure showing a state before the flexible printed circuit board is soldered to the rigid circuit board in FIG. 6.

As shown in FIGS. 5 to 7, in the embodiment of the present invention, flexible printed circuit board 7 has fixing metal foils 74 made of metal foil, in addition to conductive foils 71. Fixing metal foils 74 are located at reinforcing portions 82, and are insulated from electrode terminals 13 of battery cells 1 and conductive foils 71. Fixing metal foils 74 are used in order to fix reinforcing portions 82 to rigid circuit board 9, and have no role of electric circuit (wiring).

In the embodiment of the present invention, in order to enhance productivity, cream-type solders S are coated, and solders S are melted and welded by laser irradiation. In this case, the amount of solder S in each of fixing portions 8 is preferably the same. Additionally, the area of the foil coated with solder S, is preferably the same. When the amounts of solders are different, there is a trouble that fixing strengths are unbalanced. However, by adopting the above-mentioned configuration, the amounts of solders are comparatively balanced.

Figure 8:
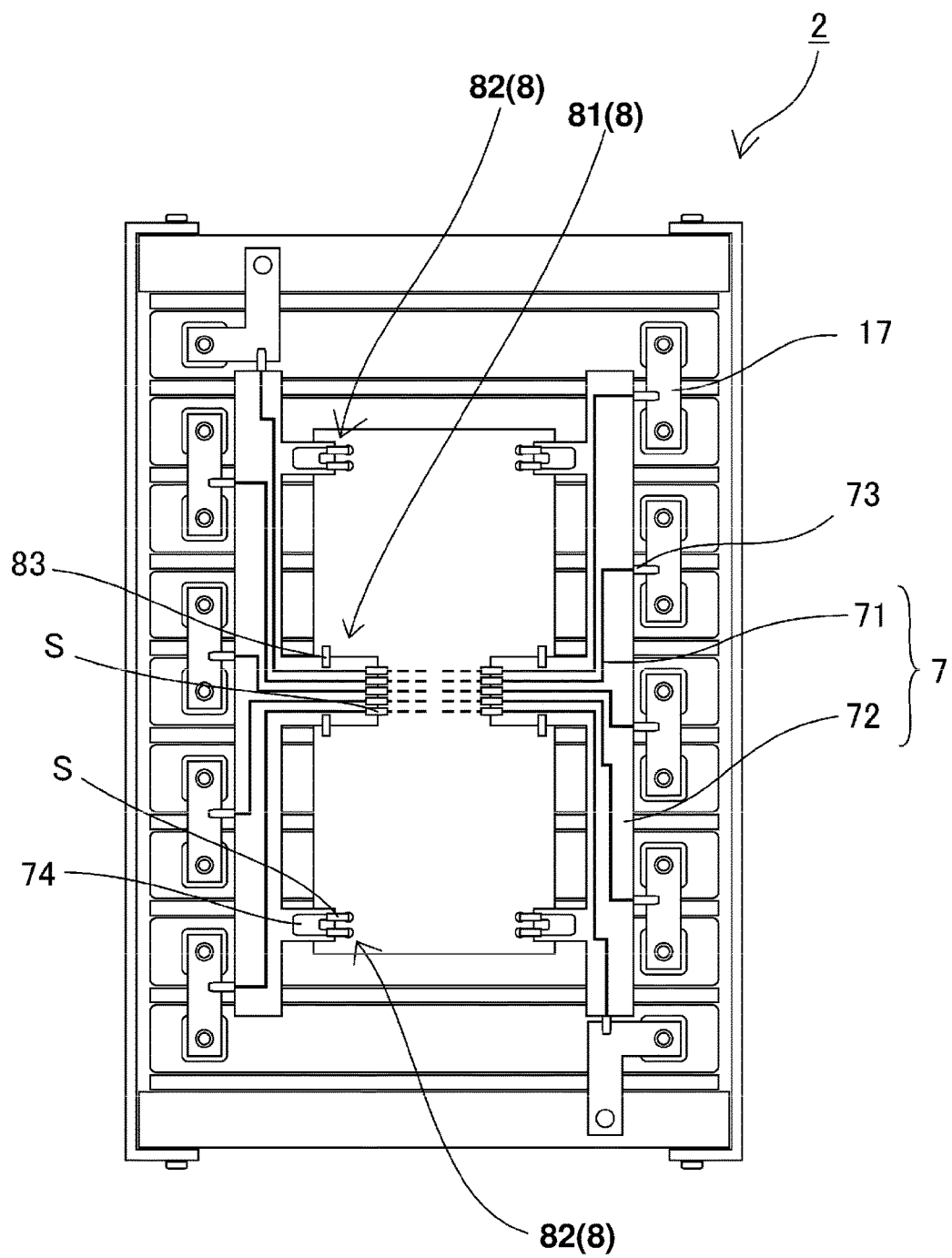
FIG. 8 is a plan view of a flexible printed circuit board according to another embodiment of the present invention.

As shown in FIG. 8, in the embodiment of the present invention, signal line connecting portions 81 are located on the upper surface of rigid circuit board 9. Signal line connecting portions 81 are fixed on the upper surface of rigid circuit board 9. Then, connecting areas where rigid circuit board 9 and flexible printed circuit board 7 are overlapped in the vertical direction, are formed. In the connecting areas, rigid circuit board 9 is located between flexible printed circuit board 7 and battery block 2, and then rigid circuit board 9 can hold the vicinity of connection side ends of flexible printed circuit board 7. According to this configuration, the weight of flexible printed circuit board 7 is not applied to the direction where it is removed from rigid circuit board 9. Then, disconnection of conductive foil 71 or removal of flexible printed circuit board 7 can be prevented. Further, a large connecting area prevents flexible printed circuit board 7 from hanging down.

Additionally, reinforcing pads 83 can be provided in the connecting area in order that fixing strength between flexible printed circuit board 7 and rigid circuit board 9 is enhanced. Reinforcing pad 83 is a fixing member having a rectangular shape in an outside appearance, and one end thereof is fixed to rigid circuit board 9, and another end thereof is fixed to flexible printed circuit board 7. Reinforcing pad 83 extends in a direction perpendicular to an extending direction of conductive foils 71 within the connecting area. Then, load on conductive foil 71 can be decreased.

As shown in FIG. 6, FIG. 7, in the embodiment of the present invention, reinforcing pads 83 are configured of fixing metal foils 74 and solders S. Signal line connecting portions 81 have fixing metal foils 74 in addition to conductive foils 71. Fixing metal foils 74 of signal line connecting portions 81 are soldered to the conductive layers of rigid circuit board 9. Fixing metal foils 74 and solders S used as reinforcing pads 83, preferably extends in a direction perpendicular to an extending direction of conductive foils 71 within the connecting area. This configuration effectively functions against strength of the removal direction of flexible printed circuit board 7, and then prevents removal of flexible printed circuit board 7.

Further, rigid circuit board 9 preferably has dummy terminals to which fixing metal foils 74 are connected, as conductive layers to which fixing metal foils 74 are connected. The dummy terminals are not electrically connected to detection circuit 90 or other circuits installed in rigid circuit board 9, and have no role of electric circuits. Then, the dummy terminals are provided in order to fix flexible printed circuit board 7 through solders S or fixing metal foils 74.

Fixing locations between signal line connecting portion 81 and rigid circuit board 9 can be many locations. In FIG. 5, signal line connecting portions 81 are provided at one end of rigid circuit board 9. However, signal line connecting portions 81 can be provided at the middle portion of the long side of rigid circuit board 9. Concretely, in another embodiment exemplified in FIG. 8, two reinforcing portions 82 and signal line connecting portion 81 are provided along the long side of rigid circuit board 9. According to this configuration, signal line connecting portion 81 is located between plural reinforcing portions 82 set along the long side of rigid circuit board 9. Then, reinforcing portions 82 located at both end of rigid circuit board 9, hold the weight of flexible printed circuit board 7, and can prevent that load concentrates at signal line connecting portion 81.

The above explanation is made based on the embodiments of the present invention. The person of the ordinary skill in the art can understand that these embodiments are illustrated, and these constitution elements and these combined processes can be modified, and such modified examples are covered by the scope of the present invention.

The invention claimed is:

1. A power source device comprising:
a plurality of battery cells respectively having electrode terminals;
a rigid circuit board including a detection circuit for detecting states in the plurality of the battery cells;
a flexible printed circuit board electrically connecting the electrode terminals and the detection circuit; and
a connecting member provided at a tip of the flexible printed circuit board, and electrically connecting the plurality of the battery cells and the flexible printed circuit board,
wherein the flexible printed circuit board has a plurality of fixing portions fixed to the rigid circuit board,
wherein the plurality of the fixing portions include: a signal line connecting portion having a plurality of conductive foils of which one side ends are fixed to the rigid circuit board, and which electrically connect the electrode terminals and the detection circuit; and one or more of reinforcing portions having a fixing metal foil of which one side end is fixed to the rigid circuit board, and which is insulated from the electrode terminals,
wherein the signal line connecting portion have a connecting area overlapping the rigid circuit board,
wherein the power source device further comprises:
a reinforcing pad extending in a direction perpendicular to an extending direction of the plurality of the conductive foils within the connecting area.

2. The power source device according to claim 1, further comprising:
a battery block having a rectangular parallelepiped shape, and including the plurality of the battery cells,
wherein the rigid circuit board is disposed so as to face one surface of the battery block.

3. The power source device according to claim 1, wherein in the connecting area, the rigid circuit board is positioned between the flexible printed circuit board and the plurality of the battery cells.

4. The power source device according to claims claim 1, wherein the plurality of the conductive foils and the fixing metal foil are fixed to the rigid circuit board through solder.

5. The power source device according to claim 4,
wherein another fixing metal foil is provided at the signal line connecting portion,
the reinforcing pad is configured of a solder welded to the another fixing metal foil at the signal line connecting portion.

6. The power source device according to claim 1,
wherein the rigid circuit board has a rectangular shape in a plan view,
the plurality of the fixing portions are disposed in parallel along a long side of the rigid circuit board.

7. The power source device according to claim 6,
further comprising a plurality of the reinforcing portions,
wherein the signal line connecting portion is disposed between the plurality of the reinforcing portions disposed in parallel along the long side of the rigid circuit board.

8. The power source device according to claim 6,
wherein the plurality of the battery cells are disposed to be stacked so as to make a plurality of terminal lines and,
the rigid circuit board is disposed between the plurality of the terminal lines such that the long side of the rigid circuit board is along an arrangement direction of the plurality of the terminal lines.

9. The power source device according to claim 6,
further comprising:
a plurality of bus-bars electrically connecting the electrode terminals each other of the plurality of the battery cells,
wherein the connecting members are a plurality of tabs welded to the bus-bars.

* * * * *